Figure 1:
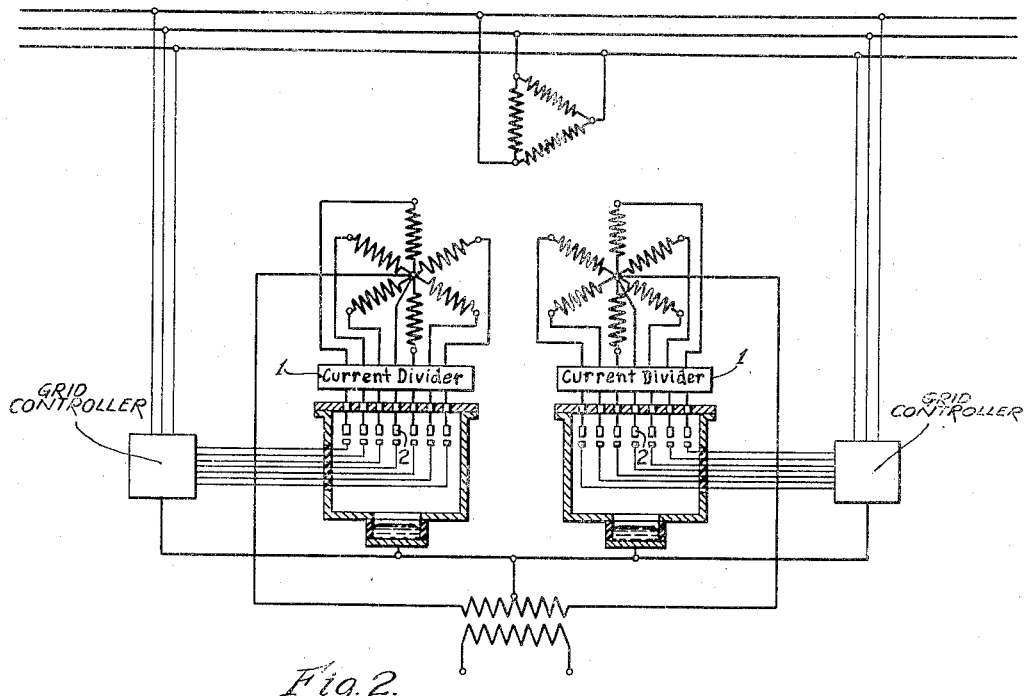

INVENTOR
Erwin Janetschke.

Nov. 15, 1938.   E. JANETSCHKE   2,137,052
ARRANGEMENT FOR CONVERTING ALTERNATING CURRENTS
Filed March 30, 1937   2 Sheets-Sheet 2

WITNESSES:
C. J. Weller.
S. A. Strickett

INVENTOR
Erwin Janetschke.
BY O. B. Buchanan
ATTORNEY

Patented Nov. 15, 1938

2,137,052

UNITED STATES PATENT OFFICE 2,137,052

ARRANGEMENT FOR CONVERTING ALTERNATING CURRENTS

Erwin Janetschke, Berlin-Charlottenburg, Germany, assignor to Westinghouse Electric & Manufacturing Company, East Pittsburgh, Pa., a corporation of Pennsylvania Application March 30, 1937, Serial No. 133,922
In Germany April 2, 1936

4 Claims. (Cl. 172—281)

My invention relates to an arrangement for converting alternating current of one frequency to alternating current of another frequency with the aid of controllable arc discharge devices, in which the desired curve shape of the voltage produced by the static frequency changer is determined by the selection of the moments at which the anodes are ignited. The static frequency changer which is in most cases employed for reducing the frequency and the number of phases of a given alternating voltage operates preferably with grid-controlled mercury arc discharge devices and is frequently designated as "a control static frequency changer" owing to the particular shape of the curve in contradistinction to the other static frequency changers in which the shape of the curve of the voltage supplied by the static frequency changer is substantially dependent upon the alternating voltages supplied to the single anodes.

It is well known that in the case of control static frequency changers which, for instance, feed a single-phase network with a frequency of 20 cycles from a three-phase network with a frequency of 60 cycles, the primary power factor cannot exceed a maximum value of 0.84, even if the power factor is unity on the single-phase side. This is due to the fact that both on the ascending portion and on the descending portion of the curve of the single-phase voltage produced by the static frequency changer, the single anodes can be ignited only on the descending portions of the curve of the alternating voltages feeding the same. The anodes operate, consequently, all with lagging ignition. Furthermore, the retardation of ignition in the neighborhood of the point at which the single-phase voltage passes through the zero value is relatively great.

To improve the power factor, condensers may be employed; the latter, however, increase the cost of the arrangement considerably.

Another way of improving the power factor consists in the fact that the transformer which feeds the static frequency changer on the three-phase side is provided with taps for component voltages and that with small instantaneous values of the single-phase voltage to be produced anodes are ignited which are fed with smaller component voltages in order that in this portion of the single phase voltage the arrangement may be operated with a higher degree of control of the primary phase voltages of the static frequency changer. In practice, this method presents certain difficulties, since, for instance, in the case of twelve-phase static frequency changer transformers whose phase voltages consist in most cases of two winding branches out of phase, a tapping of the component voltages is only possible by the use of additional winding branches.

The object of my invention is to provide a connection for static frequency changers in which the power factor may be improved by considerably simpler means without the necessity of providing the static frequency changer transformer with additional winding portions and taps. This may be accomplished according to the invention by providing additional anodes which are connected to the transformer neutral points in both component circuits of the static frequency changer. These additional anodes hereinafter referred to as "zero point anodes" render it possible to feed the component circuits of the static frequency changer with voltages which are smaller than the phase voltages of the static frequency changer transformer. In this case, the zero point anodes operate in parallel connection with one of the other anodes of the corresponding winding system of the static frequency changer transformer and the parallel operation of these anodes supplied with different alternating voltages is made possible by the magnetic coupling of both discharge circuits.

To this end, the known reactor arrangements are employed which in the form of current dividing reactors or interphase transformers are used in other converting arrangements operating with discharge vessels. The zero point anodes as well as the other anodes are equipped with control grids in order that the moment of ignition can be chosen in the zero point anodes and in the other anodes according to the desired curve shape delivered by the static frequency changer.

Figure 2:
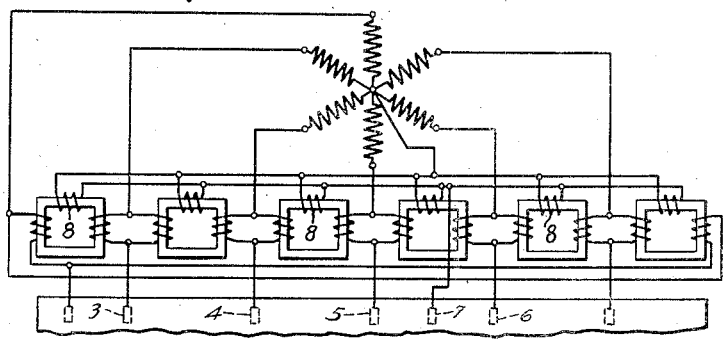
Figure 3:
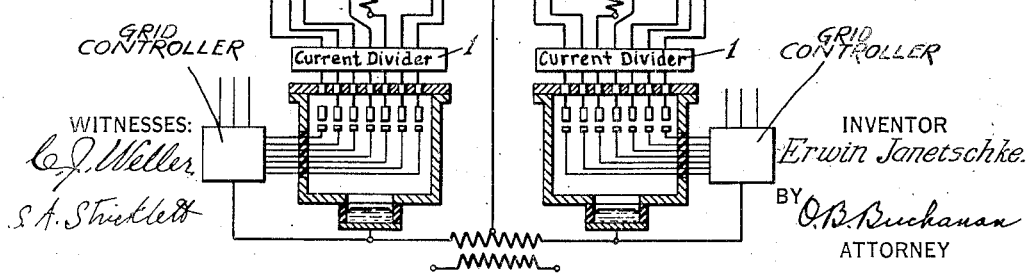
Figure 4:
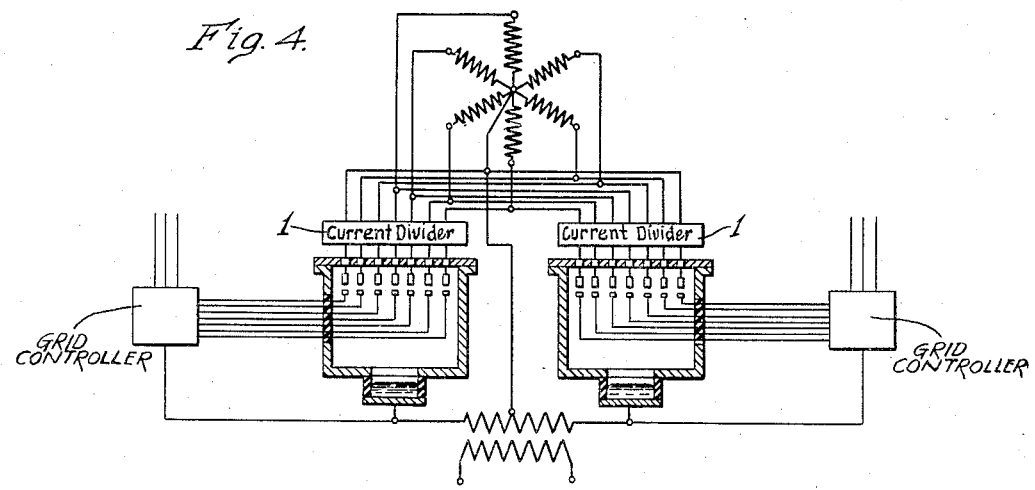
Figure 5:
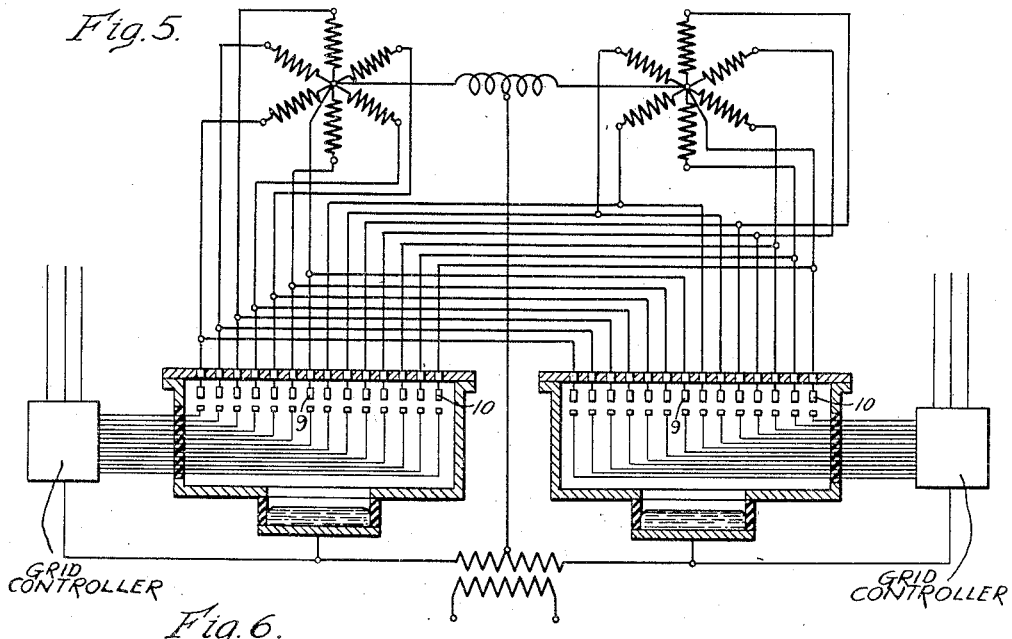
Figure 6:
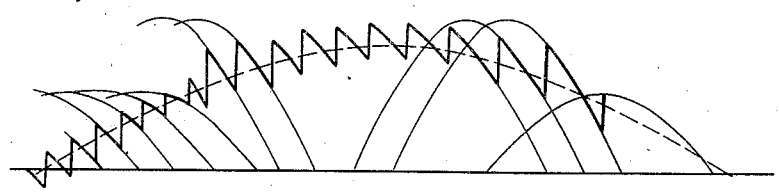

Figure 1 is a schematic illustration of a static frequency changer embodying my invention, Fig. 2 is a schematic illustration showing the connections of my current divider, Fig. 3 is a view similar to Fig. 1 showing an alternative load connection, Fig. 4 is a view similar to Fig. 1 showing a modified form according to my invention utilizing a single secondary transformer winding for feeding both sections of the stair converter, Fig. 5 is a view similar to Fig. 4 illustrating the use of a double six phase with interphase transformer secondary winding for securing effective twelve phase operation, and Fig. 6 is a diagrammatic illustration showing the method of building up the wave form of the single phase voltage.

In the accompanying drawings are shown some embodiments of my invention in diagrammatic form. Fig. 1 shows a static frequency changer operating with two mercury vapor discharge devices and in which the static frequency changer transformer is provided with two six-phase secondary windings. Between the transformers and the discharge vessels are arranged in a manner well known current dividing reactors 1. Each of the two discharge vessels is provided with a zero point anode 2 which is connected to the neutral point of the corresponding secondary winding of the transformer.

The connection of the current dividers 1 is shown in Fig. 2. Each of the anodes 3 to 6 is connected to the corresponding phases of the secondary winding of the static frequency changer transformer through two windings of the current dividing reactors. The zero point anode 7 is connected to the neutral point of the transformer through a plurality of windings 8 corresponding to the available number of current dividing reactors. On each core of the current dividing reactors are arranged three windings, two of which are connected to separate phase terminals of the secondary winding of the transformer and the third winding 8 to the neutral point of the transformer, whereas the other end of this winding 8 is connected to the zero point anode.

According to the selection of the ignition points of the anodes of both discharge vessels of the static frequency changer there are three possibilities for the effective voltage in a component circuit of the static frequency changer:

*a.* The mean value of two phase voltages shifted with respect to one another in accordance with the number of phases of the static frequency changer transformer,

*b.* The mean value between a phase voltage and the zero point voltage; that is, half of the phase voltage,

*c.* The mean value of two phase voltages displaced by 60° and the zero point voltage, or half of the voltage value of *a*.

If as is usual in practice a twelve-phase connection is employed, the connection shown in Fig. 1 may be easily used for the twelve-phase connection. The corresponding voltages under *a* and *c* are in phase, whereas the voltage under *b* is 15° out of phase. Assuming that the phase voltage is equal to 100%, the voltage effective in the component circuit of the static frequency changer is equal to 96.6% in the case of a twelve-phase connection under *a*, to 50% under *b* and under *c* to about 48% of the phase voltage. These three voltage values may be used by correspondingly designing the control of the static frequency changer in order to adapt as far as possible the voltage produced by the static frequency changer to the desired curve shape, for instance, to the sine shape and, also, to operate as far as possible with a high control of the individual anodes.

In addition to the connections for the discharge devices, current dividers and transformer windings of the static frequency changer as shown in Fig. 1, there are other possibilities without departing from the principle of the invention. In Fig. 3, for instance, is shown a connection for the static frequency changer in which the cathodes of both discharge devices cannot be grounded as in the connection shown in Fig. 1. The cathodes of the discharge devices are connected to both ends of the primary winding of the single-phase transformer, whose central tap is connected to the neutral points of both secondary windings of the static frequency changer transformer.

The current division is effected in this connection in the same manner as in the connection of Fig. 1 by reactors which are arranged between the transformers and the anodes of both discharge devices. By these reactors as is also the case with the connection shown in Fig. 1, the circuits of the zero point anodes are magnetically coupled with the anodes which carry current at the same time as the circuits of the zero point anodes.

Another embodiment of my invention is shown in Fig. 4. This connection differs from the connection shown in Figs. 1 and 3 by the fact that there is only one secondary winding of the static frequency changer and that each phase winding of this secondary winding is connected to each anode of both discharge devices. Also in this connection the cathodes of the discharge devices cannot be grounded.

In the connection shown in Fig. 5, an interphase transformer whose central tap is connected to the neutral point of the primary winding of the single phase transformer lies between the neutral points of both secondary transformers. Consequently, in this connection current dividing reactors are not provided in the anode circuit of the discharge vessels as is the case with the connection shown in Figs. 1, 3 and 4. This connection entails a somewhat different arrangement of the circuits of the zero point anodes, and more precisely both discharge vessels as will be seen from Fig. 5 are each equipped with two zero point anodes 9 and 10 and these two anodes are so connected that one anode of both discharge vessels is connected to the neutral point to either transformer winding. This connection is necessary, because the interphase transformer only fulfils its purpose if a phase of the left-hand and a phase of the right-hand transformer winding is always switched in at the same time and because a direct conductive connection of both neutral points of the transformer windings must be avoided. The control of both zero point anodes of both discharge devices must in this case always be so designed that only one of the two anodes may be released by the grid control.

For instance, an anode of the left-hand transformer winding cooperates then with the zero point anode of the right-hand transformer winding and in the next cycle the left-hand zero point anode with an anode which is connected to the right-hand transformer winding. It is assumed that in the connection shown in Fig. 5 a twelve-phase transformer is employed. The same connection may, however, also be designed for other numbers of phases; for instance, for six phases, i. e., for two three-phase secondary windings. The twelve-phase connection of Fig. 5 shows that the arrangement may be operated with normal six-phase connected part-windings of the static frequency changer transformer in contradistinction to the other converting arrangements which also operate with intermediate voltage values and which, however, require taps on the static frequency changer transformer.

To explain the operation of the invention, the formation of a half cycle of the single phase voltage of the static frequency changer is graphically represented in Fig. 6. It is assumed that two anodes are at the same time in the active period (simple current division) and that, consequently, two voltage groups 15° out of phase are available in which the peak value of the smaller voltage amounts to about 52% of the peak value of the greater voltage. As will be seen from the graph shown in Fig. 6, the smaller voltages are employed for the formation of the single-phase voltage at the beginning and at the end of the single-phase voltage.

In the middle portion of the single-phase voltage curve this voltage is as usual formed of the half waves of the full phase voltage of the static frequency changer transformer. As will be apparent from the graph, the arrangement operates with a considerably higher degree of control at the beginning and at the end of the half wave of the single-phase voltage and a considerably better power factor is, therefore, obtained at the three-phase side. Furthermore, the graph shows that the invention has the advantage that also the curve form of the single phase voltage substantially approaches the desired sine shape and that the ripple of the voltage produced is considerably smaller, for the zig-zag curve of the single phase voltage differs only to a comparatively slight extent from the sinusoidal single-phase voltage indicated in the drawings as a dash curve. If connections with entirely equal phase voltage groups are employed, considerably greater departures from the sine shape will be obtained.

The graph shown in Fig. 6 is only to be considered as an embodiment. The possibility of reducing the effective static frequency changer voltage may be, as already mentioned, also taken advantage of in another manner by utilizing not only voltages equal to the half value of the phase voltage, but other intermediate value for the formation of the voltage supplied by the static frequency changer. In contradistinction to Fig. 6, the arrangement may also be operated with a multiple current division, i. e., with connections in which not only two but a plurality of anodes carry current at the same time.

I claim as my invention:

1. A static frequency changer comprising a polyphase supply circuit, a single phase load circuit, two arc-discharge devices having a plurality of controlled arc paths for transferring energy between said circuits, a polyphase transformer means for coupling said polyphase circuit to said arc paths, transformer means for coupling said arc-paths to said load circuit, an auxiliary controlled arc path for each of said arc-discharge devices, said auxiliary arc-path being connected to a mid-tap in said first-mentioned transformer means.

2. A static frequency changer system comprising a polyphase supply circuit, an alternating current load circuit, a plurality of arc-discharge devices for transferring energy between said circuits, each of said arc-discharge devices including a plurality of controlled arc-paths, transformer means having a neutral connection for connecting said polyphase circuit to said arc-paths, a second transformer means for connecting said arc-discharge device to said load circuit, a controlled zero point associated with each arc-path of said arc-discharge devices and auxiliary transformer means for averaging the effective voltages of the active arc-paths.

3. A static frequency changer system comprising a polyphase supply circuit, an alternating current load circuit, a plurality of arc-discharge devices for transferring energy between said circuits, each of said arc-discharge devices including a plurality of controlled arc-paths, transformer means having a neutral connection for connecting said polyphase circuit to said arc-paths, a second transformer means for connecting said arc-discharge devices to said load circuit, a controlled zero point associated with each arc-path of said arc-discharge devices, current dividing transformers including winding means in series with each of said arc-paths and magnetic cores interlinking said winding means.

4. A static frequency changer system for converting polyphase alternating current of a given frequency to single phase alternating current of a lower frequency comprising a polyphase circuit, a single phase circuit, two multi-anode grid-controlled arc-type converters for controlling current flow between said circuits, a polyphase transformer means including two star connected polyphase windings having the phase terminals thereof connected respectively to the anodes of the converters, single phase transformer means connected to the cathodes of said converters and to the star points of said polyphase transformer means, a zero point anode in each of said converters, said zero point anodes being connected to the star points of the respective star connected windings, two parallel current divider windings in series with each phase terminal of said star connected windings, a magnetic core interlinking each of said current divider windings with a winding of an adjacent phase terminal, a third winding on each of said magnetic cores, said third windings being connected in parallel and said parallel windings being connected in series between said zero point anode and the star point of the associated star connected winding.

ERWIN JANETSCHKE.